United States Patent
Korpi

Patent Number: 5,526,674
Date of Patent: Jun. 18, 1996

[54] METHOD AND APPARATUS FOR IMPROVED FLOW RATE MEASUREMENT AND CALIBRATION

[75] Inventor: David M. Korpi, Salinas, Calif.

[73] Assignee: Sierra Instruments, Inc., Monterey, Calif.

[21] Appl. No.: 324,377

[22] Filed: Oct. 17, 1994

Related U.S. Application Data

[63] Continuation of Ser. No. 876,475, Apr. 30, 1992, abandoned.

[51] Int. Cl.⁶ ................................. G01F 25/00
[52] U.S. Cl. ................................. 73/3.000
[58] Field of Search .......... 73/3; 91/1; 92/5 R; 417/63

[56] References Cited

U.S. PATENT DOCUMENTS

| | | | |
|---|---|---|---|
| 4,253,156 | 2/1981 | Lisle et al. | 73/3 |
| 4,372,150 | 2/1983 | Stephens et al. | 73/61.52 |
| 4,419,880 | 12/1983 | Hanowich | 73/3 |
| 4,543,649 | 9/1985 | Head et al. | 92/5 R |
| 4,581,707 | 4/1986 | Miller | 73/861 |
| 4,674,317 | 6/1987 | Cohrs et al. | 73/3 |
| 4,794,785 | 1/1989 | Cohrs et al. | 73/3 |
| 4,938,054 | 7/1990 | Dye et al. | 73/3 |

FOREIGN PATENT DOCUMENTS

| 2752993 | 5/1979 | Germany | 91/1 |
|---|---|---|---|

*Primary Examiner*—Hezron E. Williams
*Assistant Examiner*—Daniel S. Larkin
*Attorney, Agent, or Firm*—LaRiviere, Grubman & Payne

[57] ABSTRACT

A method and apparatus for precise measurement and calibration of gas flow rates is described. The apparatus and method employ precision-bored cylinders adapted for operation with ultrasonic transducers under the control of computer subroutines for accomplishing the desired methods.

1 Claim, 10 Drawing Sheets

METHOD AND APPARATUS FOR IMPROVED FLOW RATE MEASUREMENT AND CALIBRATION

This is a continuation of application Ser. No. 07/876,475, filed Apr. 30, 1992 now abandoned.

BACKGROUND OF THE INVENTION

1. Field of the Invention

The present invention relates to the art of gas flow rate calibrations and, in particular, to flow rate calibration benches and methods for accurately measuring and establishing the flow rate of a gas for use as a calibration standard for flow meters and other applications.

2. Prior Art

Because flow measurement is fundamental to many industrial and scientific processes, flow meters are applied to processes which extend over extremely wide ranges of flow rates. To maintain accuracy of this range of application requires that calibration systems capable of operating on the same range of flow rates and gases as do the flow rate meters themselves be readily available and efficiently operable.

Fluid flow rate meters are well known to the prior art. In the most general description, these devices measure fluid flow by sensing and quantifying selected physical parameters of the fluid flowing in a given flow path.

Primary flow calibration systems must allow users to verify by reference to primary standards, of length and time, the accuracy of the system, and thereby to calibrate mass flow meters and flow controllers automatically with the highest degree of accuracy.

One class of such devices has been established in the prior art.

In such devices the gas enters a precision-bored glass tube in which a mercury-sealed piston is located. As gas enters the tube, with the volume below the bottom of the piston, the sealed piston rises. The diameter, and therefore the cross sectional area of the tube is known in precise terms. This means that the vertical distance swept out by the piston in a given time is the volume displaced by the piston over that period of time.

Done manually, this method is true, but slow, and subject to human error, because of the requirement that a technician on hand with a stop watch, carefully note the position of the piston and start and stop the timer at the exact moment of passage by reference points.

The manual method has been generally replaced with electronic systems that measure piston movement precisely and which can resolve time into small parts of a second, and distance into small fractions of a centimeter.

Operating over a wide range of flow presents problems to the flow meter and calibration standards alike.

Several attempts at solving the problem of calibration of the primary flow rate have been attempted. Porter, U.S. Pat. No. 3,125,879, uses photocells to detect the passage of the piston through a predetermined range. The photocells use reflected light from the ring of mercury which forms the seal between the piston and the tube in which the piston moves. This method of position detection suffers from the fact that the mercury ring does not present a sharp edge, nor do the sensors have a narrow enough range of perception of the reflected light. In addition, the index of refraction of the glass causes uncertainty in the position of the piston with respect to its perceived reflection at the sensor.

The Porter class of devices also suffers from the fact that only fixed spacings are used for the measurement of volume. The area swept by the piston, as it goes through the fixed area between two points, does indicate an accurate measure of the volume and by measuring the time of the piston travel, the rate of flow is determined on the average over that interval. However, at any given period within the interval, the flow rate may vary widely without it being known.

Another method of measuring flow rates in the prior art employs a band which attaches to the piston and which passes over a precision pulley which drives the shaft of an optical encoder. Jackson, U.S. Pat. No. 4,307,601, is typical of this type of device.

The Jackson device improves over Porter in that it is possible to tell more quickly the amount of volume over an increment of time, and the piston does not have to fall through the entire length of the chamber between two fixed intervals. However, there are problems in using any kind of noncontinuous resolution encoder. Even the Jackson device which is described as having an encoder having 2000 counts per revolution would suffer from the inaccuracy which implies; For the dimensions listed Jackson would yield an inaccuracy of 0.003 inch per count merely because of the finite encoder steps. This is a fundamental limitation on the accuracy of the device. In addition, other inaccuracies may be the result of slippage of the band over the pulley, and the pulley's eccentricities. All of these sources of error must be taken into account.

Neither of the devices described above, but particularly Porter, can accurately determine whether the piston is rising at a constant rate, an important parameter if the flow instantaneous rate rather than merely the accuracy is to be determined accurately.

SUMMARY OF THE INVENTION

Accordingly, a need exists for a calibration system which can be adapted to use over a wide range of flow rates, while maintaining flow laminarity which is necessary for accuracy over the entire usable scale of the meter and which can determine on an instantaneous basis the magnitude of derivation from predicted and set performance; and which can self-test for leaks, calibrate devices automatically and which can be relied upon for.

The present invention provides these and other advantages by providing a method and apparatus having precision-bore cylinder adapters for operation with ultrasonic transducers under the control of computer subroutines for accomplishing the desired methods.

DESCRIPTION OF THE PREFERRED EMBODIMENT

Figure 1:
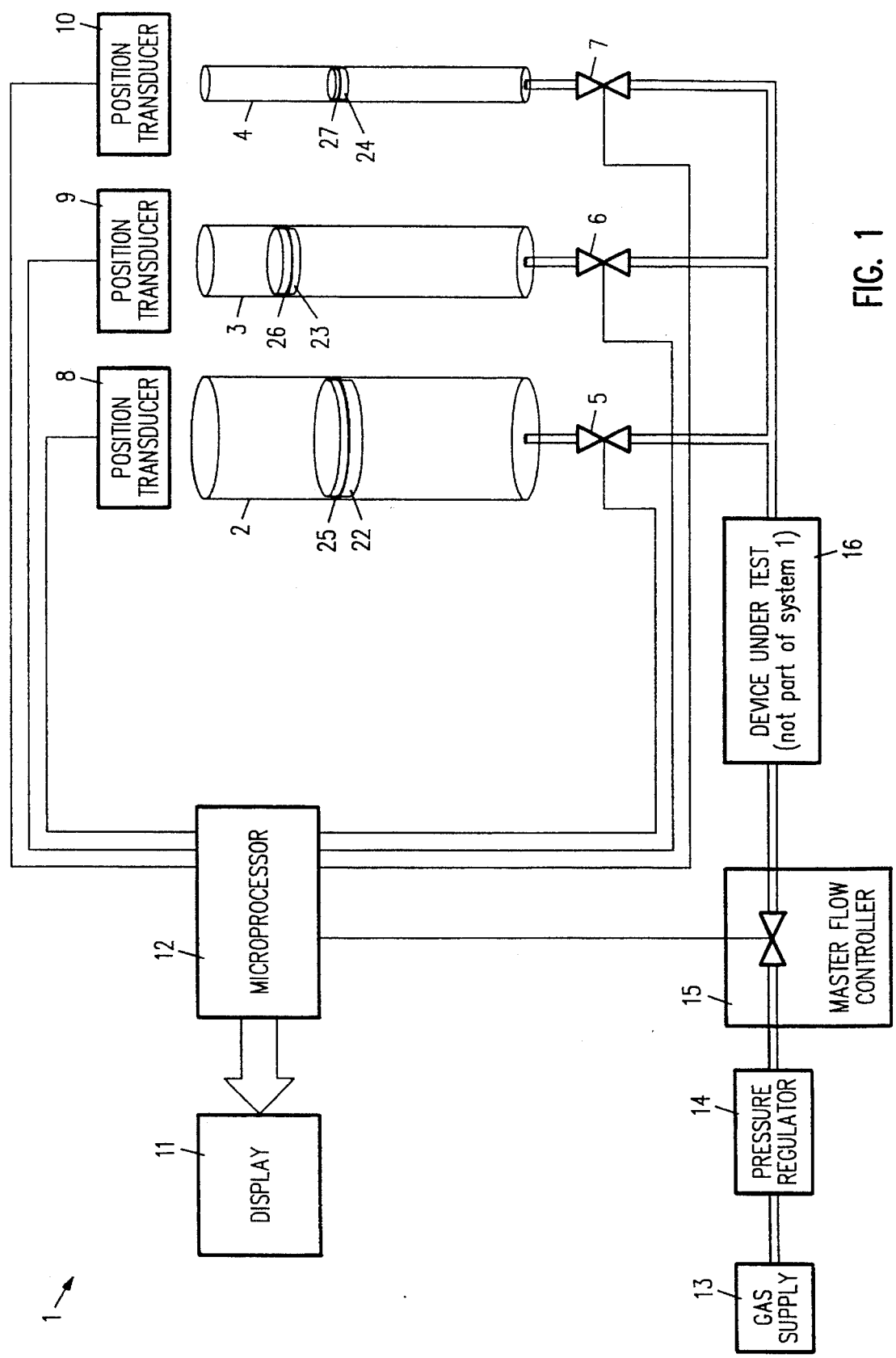
FIG. 1 is a simplified diagram of a flow rate calibration system of the type employing precision-bored cylinders with a liquid mercury sealed piston, showing the interrelation of the master flow controller, the device under test and the precision cylinders and pistons.

In FIG. 1 the overall apparatus of a flow rate calibration system 1 is shown, along with a device under test 16, showing the relationship of the device under test 16 to the rest of the system.

The system employs a plurality of tubes, preferably of borosilicate glass, having optimally chosen area ratios for the greatest resolution over the desired range of gas flows. Area ratios of 10 to 1 are preferred. Gas flows from 10 standard cubic centimeters per minute (SCCM) to 30 standard liters per minutes (SLPM) are typical of most generally encountered ranges.

Each tube contains a piston 22, 23, and 24 for the large, medium, and small tubes respectively, having a liquid mercury seal 25, 26, 27. Gas is introduced to each tube, by means of electrically controlled valves 5, 6, and 7, selected depending upon which tube is being utilized, a selection in term made upon the flow rate to be encountered in using the system.

Each cylinder has a position transducer 8, 9, and 10 corresponding to large, medium, and small tube cylinders respectively, which is used to quantify the movement of the piston in response to gas flow into or out of the cylinder. As gas enters a cylinder, the sealed piston in the cylinder rises. Since the diameter of the tube is precisely known, its cross-sectional area is likewise precisely known. As the piston sweeps through the cylinder, it displaces a volume of the cylinder which can be precisely measured by precisely measuring the distance travelled by the piston. Since length is a fundamental standard, and the accuracy of the cylinders can be traced to fundamental standards, if the volume which is swept by the piston can be given primary standard status.

The position transducer utilizes the sonar principle by emitting a pulse of ultra-sonic sound energy which travels down the tube and is reflected from the piston and returns to the transceiver. The electronics of the position transducer accurately determines the distance by measuring the transit time of that energy pulse. It will be appreciated that the sonar position transducer provides one type non-contact position transducer which senses the position of the piston without physical contact between the piston and transducer. Other non-contact position transducers are hereafter discussed. It will also be appreciated that by using a non-contact position transducer and liquid mercury sealed pistons in the cylinder, the pistons are free floating within the cylinder. The computer then accurately calculates the speed of sound, taking into account ambient conditions of temperature, pressure and relative humidity, and thereby correcting the speed of sound for those conditions since time can also be related back to a fundamental standard, the volume per unit time, i.e., the flow rate, it also becomes a primary standard.

Figure 2A:
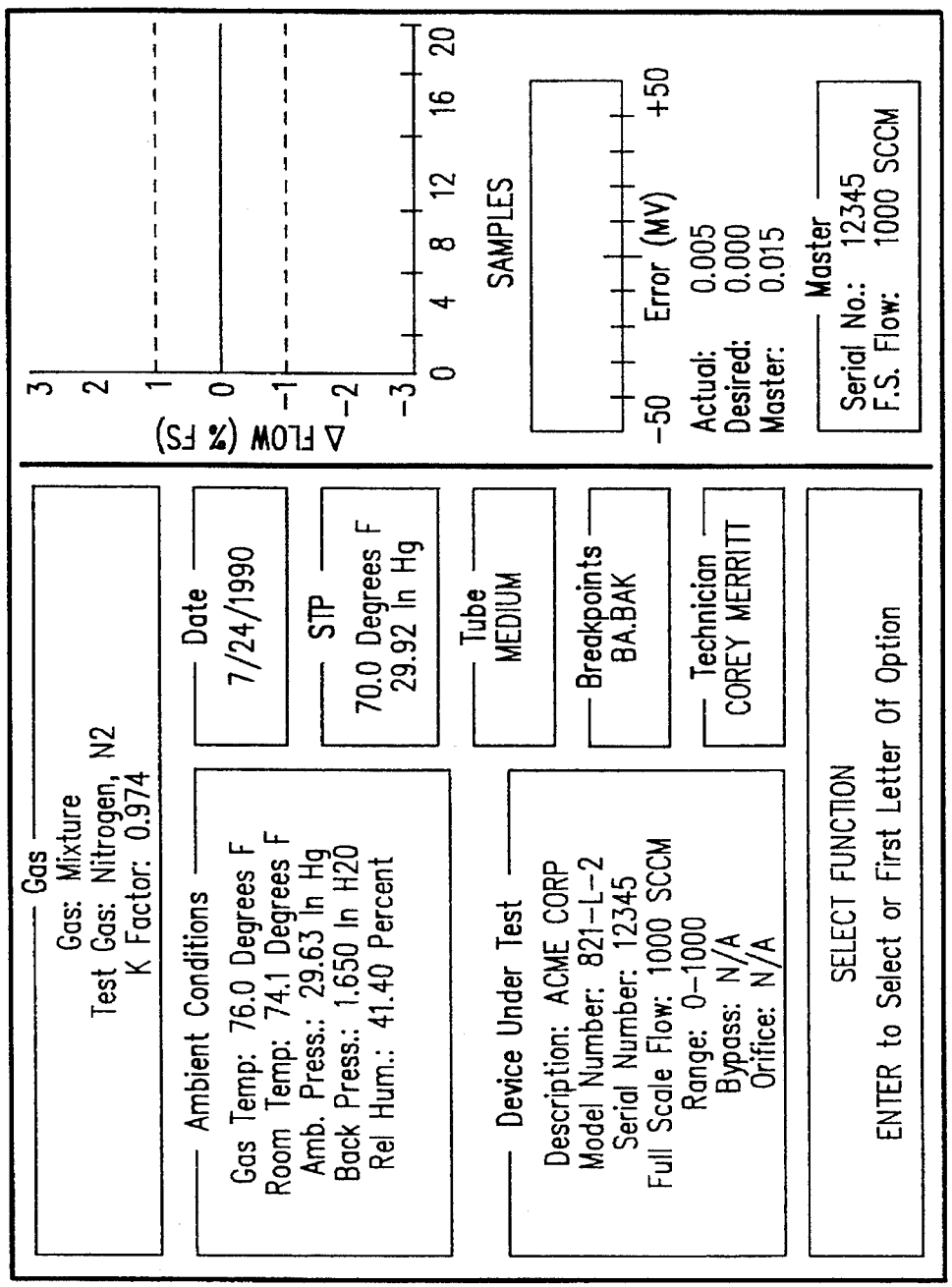
FIG. 2A shows a typical display of the system showing the conditions which may be established and accounted for in the systems operation.
Figure 2B:
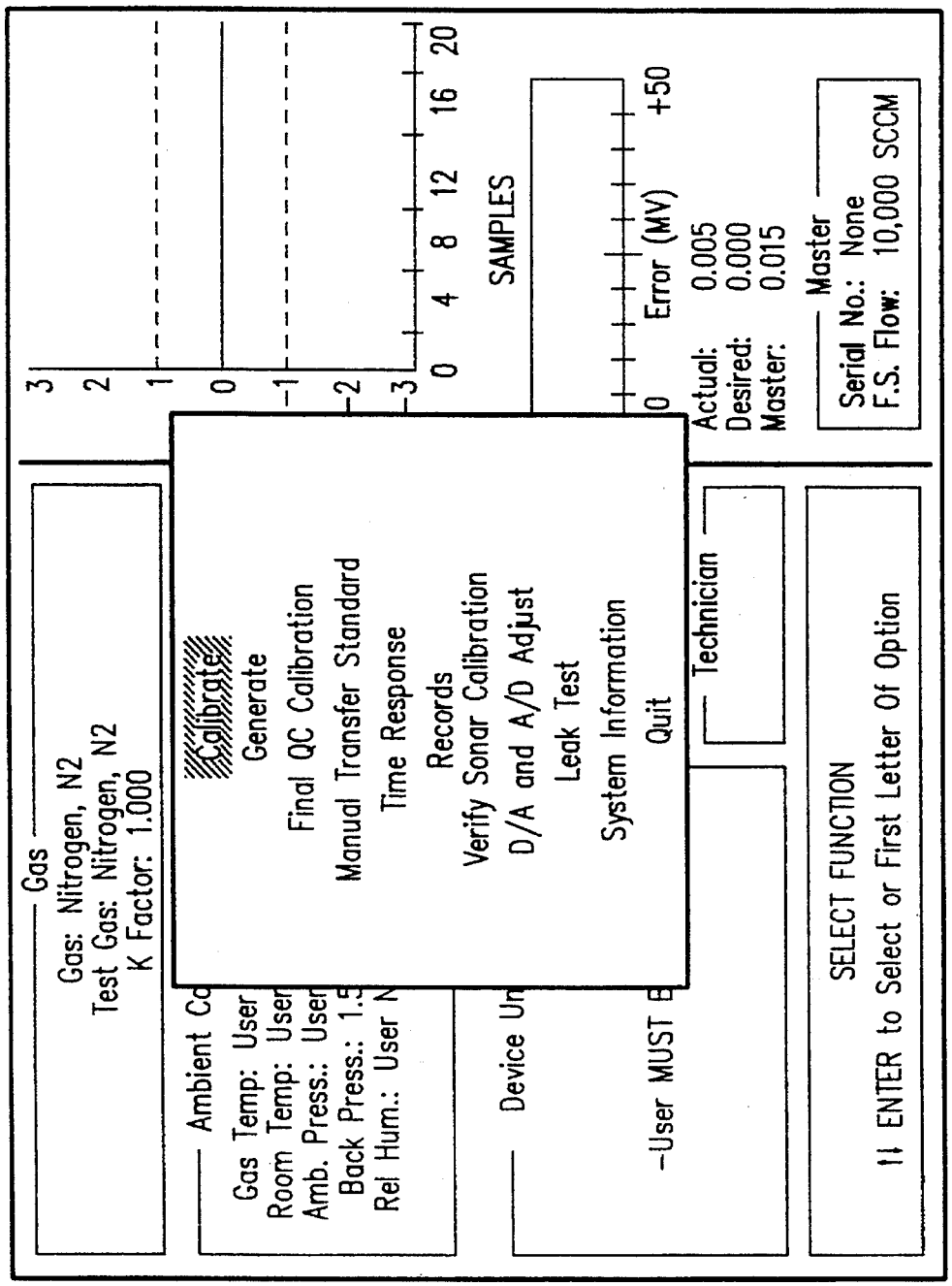
FIG. 2B shows a the display of FIG. 2A with a pull-down menu which prompts the operator for inputs.

Display 11 is driven by MICROPROCESSOR 12 and serves both as a vehicle for instructing the operator and a readout device for displaying the measurement results. A typical screen display is shown in FIG. 2A. In FIG. 2B, a "pop-up" menu has been super-imposed over the basic screen prompting the operator to select among several operating modes. This process is described further in the discussion below of the select conditions subroutine, described in FIG. 3.

A GAS SUPPLY 13 is provided to and maintained by PRESSURE REGULATOR 14 to give a stable input to the system. However, the MASTER FLOW CONTROLLER 15, under the control of the microprocessor and the various subroutines actually establishes the flow into a device under test Acceleration of the piston is taken into account. This effect has never been accounted for by any supplier of primary calibration equipment. As the velocity of the piston goes up, the acceleration effect becomes more important. This effect can contribute to an error in excess of 1% under the worst case conditions.

The system automatically generates a requested flow rate of any selected value using the flow control valve 15 on the primary measured flow. In some operation modes, the flow rate is established and maintained by a closed-loop feedback system which sets the flow rate to a calibrated value based on direct measurement of flow rate by use of the piston velocity.

Figure 3:
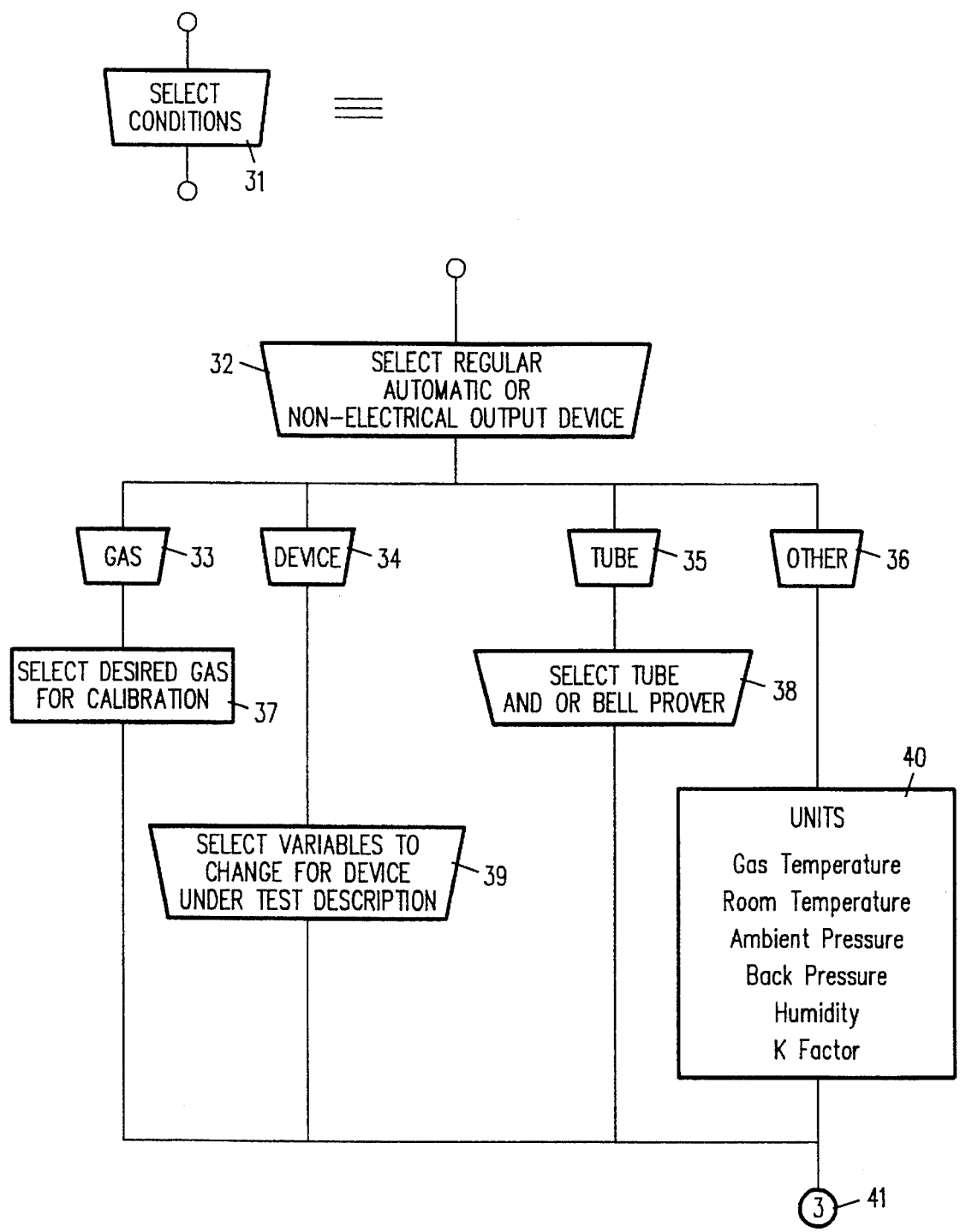
FIG. 3 is a flow chart depiction of the method steps and a computer subroutine to implement those steps for establishing initial conditions for the test procedures in the following charts.

Referring now to FIG. 3 there is shown a detailed flow chart of the steps which are represented in all of the other flow charts by the term "SELECT CONDITIONS". The equivalency of this step is depicted in FIG. 3 by showing the step SELECT CONDITIONS 31 as being itself the equivalent to a flow chart of the subroutine which is entered at SELECT REGULAR AUTOMATIC OR NON-ELECTRICAL OUTPUT DEVICE 32. When this subroutine is entered, as it must be before any of the other subroutines can be performed, the operator is required to make a selection of several parameters to establish the operating conditions for the subsequent tests. In particular, the operator is instructed to make a selection of the following:

1) GAS 33 is selected to establish the characteristics of the desired gas for which the calibration will be performed. The available gases depend of course upon the gas supply, and some gases may be substituted for others as is well-known to those skilled in the art. The operator is instructed to "SELECT DESIRED GAS FOR CALIBRATION" 37, which establishes the conditions under which the following tests will be performed as to the type of gas.

2) If the operator so desires, or the equipment so requires, the DEVICE 34 subroutine may be chosen. Under this subroutine the operator is instructed to SELECT VARIABLES TO CHANGE FOR DEVICE UNDER TEST DESCRIPTION 39.

3) Depending upon the flow rate ranges which the device under test may be required to operate with, the operator may be required to select the TUBE 35 subroutine under which subroutine he is able to SELECT TUBE AND/OR BELL PROVER 38 as is appropriate for the test.

4) Other miscellaneous parameters may be adjusted by entering the OTHER 36 subroutine which gives the operator the choice of various set-up parameters including gas temperature, room temperature, ambient pressure, back pressure, humidity, and K-factor.

Figure 4:
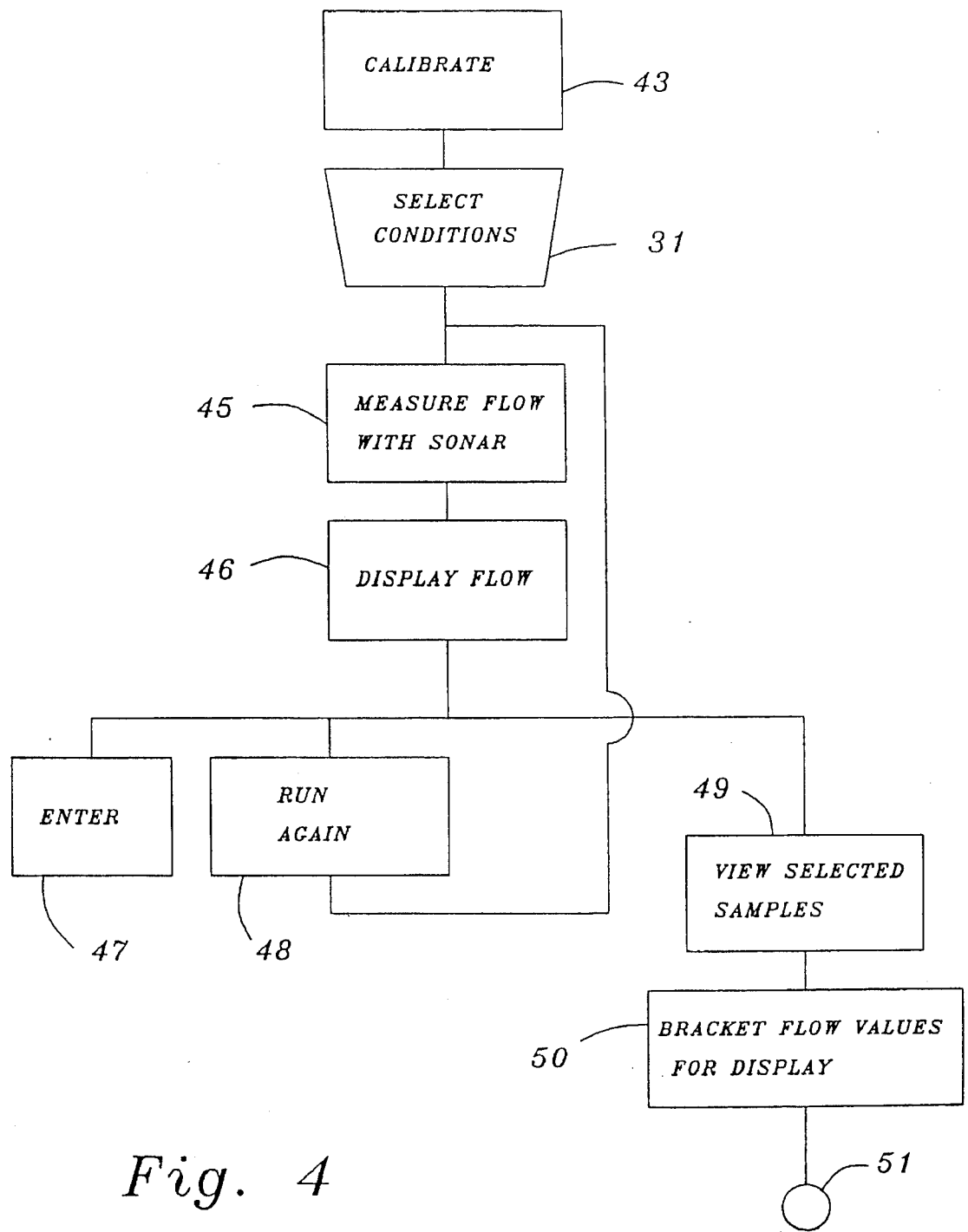
FIG. 4 is a flow chart depiction of the method steps, and computer subroutine to implement those steps, for calibrating the calibration system in accordance with the present invention.

Referring now to FIG. 4, the subroutine steps are shown which are necessary for calibrating a device under test 16. This method is an open loop method for calibration. Flow rates are established externally by manual adjustment of the flow controller. For flow controller calibration, of course, the device's own control adjustment may be set to the desired flow rate through injecting the appropriate setpoint signal from an external source. In this mode, the calibration system 1 serves as a highly accurate flow meter against which the device under test 16 may be compared.

Entering at CALIBRATE 43, the operator is instructed to SELECT CONDITIONS 31 as described above.

The apparatus then initiates a measurement of the flow into the tubes by measuring the position and change of position of the piston, e.g., 22 over time (MEASURE FLOW WITH SONAR (45)). The apparatus then displays the flow (DISPLAY FLOW (46)) and may then either continue to transit the same loop 45, 46, 48 or VIEW SELECTED SAMPLES 49, followed by BRACKETING FLOW VALUES FOR DISPLAY 50. The subroutine is exited at 51.

Figure 5:
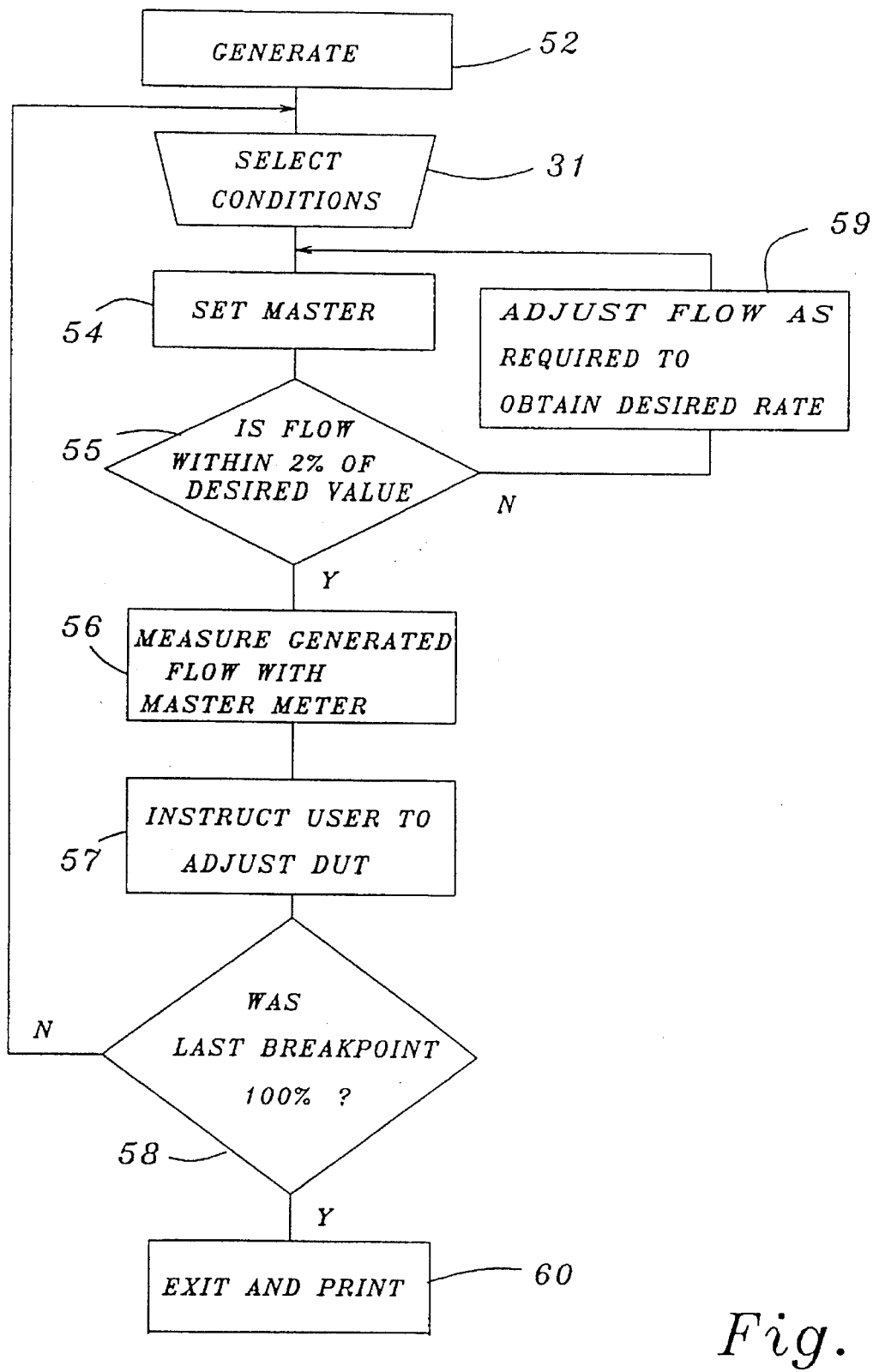
FIG. 5 is a flow chart depiction of the method steps, and, a computer subroutine to implement those steps, for performing the function of generating a precisely controlled flow rate in accordance with the present invention.

Referring now to FIG. 5 there are shown the subroutine and method for performing the GENERATE function. In this mode, the system automatically establishes and maintains a precise gas flow. The precision bore cylinders 2, 3, and 4 and their associated transducers are relied upon to precisely measure flow rates which are generated, and to control the master flow controller in order to maintain that rate after it has been established.

The operator is allowed to select the proper range tube and is given the choice of how many calibration points he wishes to calibrate. The computer instructs the operator when to adjust the potentiometers on the device under test and prompts the operator to hit "return" when he is through. After the data point is read by the computer, it then generates the next calibration point for adjustment. The computer uses the primary tubes as the means to "close the loop" on actual measured flow. This method allows users to precisely generate an exact flow for mass flow meters which utilize linearizers with breakpoints which must be set at predetermined flow rates.

In contrast, a poorly or imprecisely set and controlled, test gas could be relied upon to produce a relatively arbitrary flow rate which is then measured by the primary calibration tubes, and the device under test 16 is made to read correctly for that rate. This is the mode described above in the CALIBRATE 43 subroutine in connection with FIG. 4. This "open-loop" approach is more difficult to work with and requires much more operator involvement.

This process is continued until all calibration points are generated. The computer then takes the data and uses mathematics to fit a multi-term polynomial to the data such that the error is less than 0.04% of the actual data while "throwing out" any erratic data. The computer then allows the operator to view, on the display, the data in graphic and tabular form to check the validity of the data before printing out hard copy. This process can be repeated using the same master without re-entering the data over again.

The subroutine is entered at GENERATE 52 following which the operator is instructed to SELECT CONDITIONS 31 as described above. The master flow controller is then set (SET MASTER (54)) and the flow is tested to be whether it is within 2% of the desired flow value created by the initial settings at SET MASTER 54. If the test is negative, the loop is traversed again through ADJUST FLOW AS REQUIRED TO OBTAIN DESIRED RATE 59, SET MASTER 54 IS FLOW WITHIN 2% OF DESIRED VALUE 55, as many times as is necessary to obtain the desired rate. This loop 54, 55, 59, is a short-term measurement intended to bring the flow rate conditions into the "range near the desired point for measuring the device under test". To accomplish this, short movements of the piston are used.

If the flow is within 2% of the desired value, ("Y" at the flow is then measured with the master meter (MEASURE GENERATED FLOW WITH MASTER METER (56)). This is a long-term measurement which is used to establish the accuracy of the flow more precisely.

Once the long-term accuracy of the flow rate has been established, the operator is instructed then to perform necessary adjustments to the unit under test. During this time, the routine tests to determine if the last breakpoint was 100% (WAS LAST BREAKPOINT 100%? (58)). The breakpoints are pre-established points for calibration of the device under test. A typical device under test may be calibrated at 4 or 5 breakpoints. If the last one was 100%, i.e., the highest value of the range of over which the device under test will be tested then the test is passed ("Y" at 58) and the subroutine is exited (EXIT AND PRINT 60). If the breakpoint was less than 100%, then the test is failed, ("N" at 58) and the loop is 53, 54, 55, 56, 57, 58 is traversed again for as many times as necessary until the last breakpoint is 100%.

Figure 6:
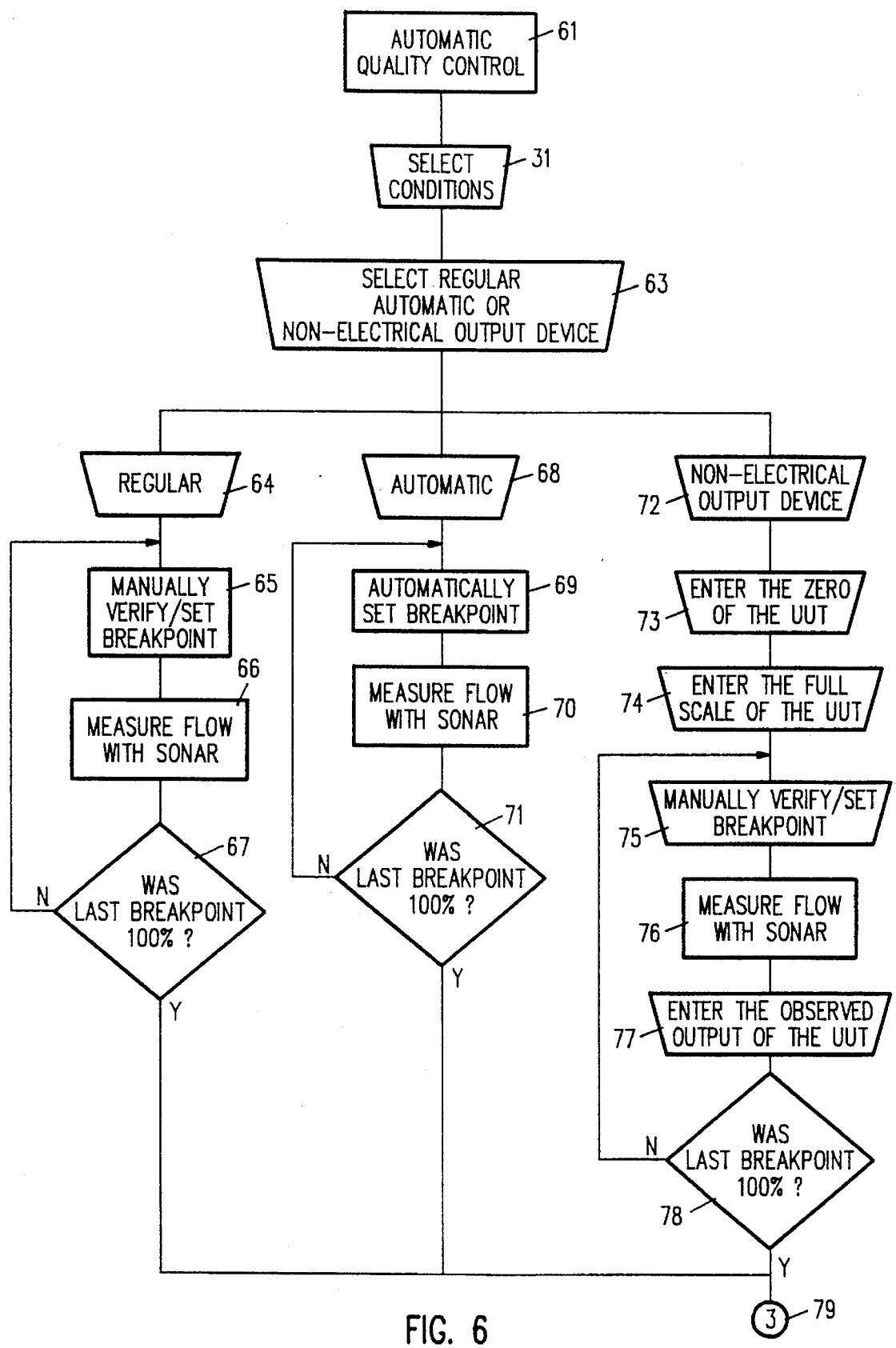
FIG. 6 is a flow chart depicting the method steps, and a computer subroutine to implement those steps, for verifying the correctness of preceding steps performed on a device under test.

Referring now to FIG. 6 there is shown the subroutine for verifying that the calibration of a flow meter or flow controller is correct. The system 1 provides the setpoint signal for a controller, then reads the analog output which the flow controller indicates and compares it to the flow measured by the system 1 precision bore cylinders 2, 3 and 4.

Figure 7:
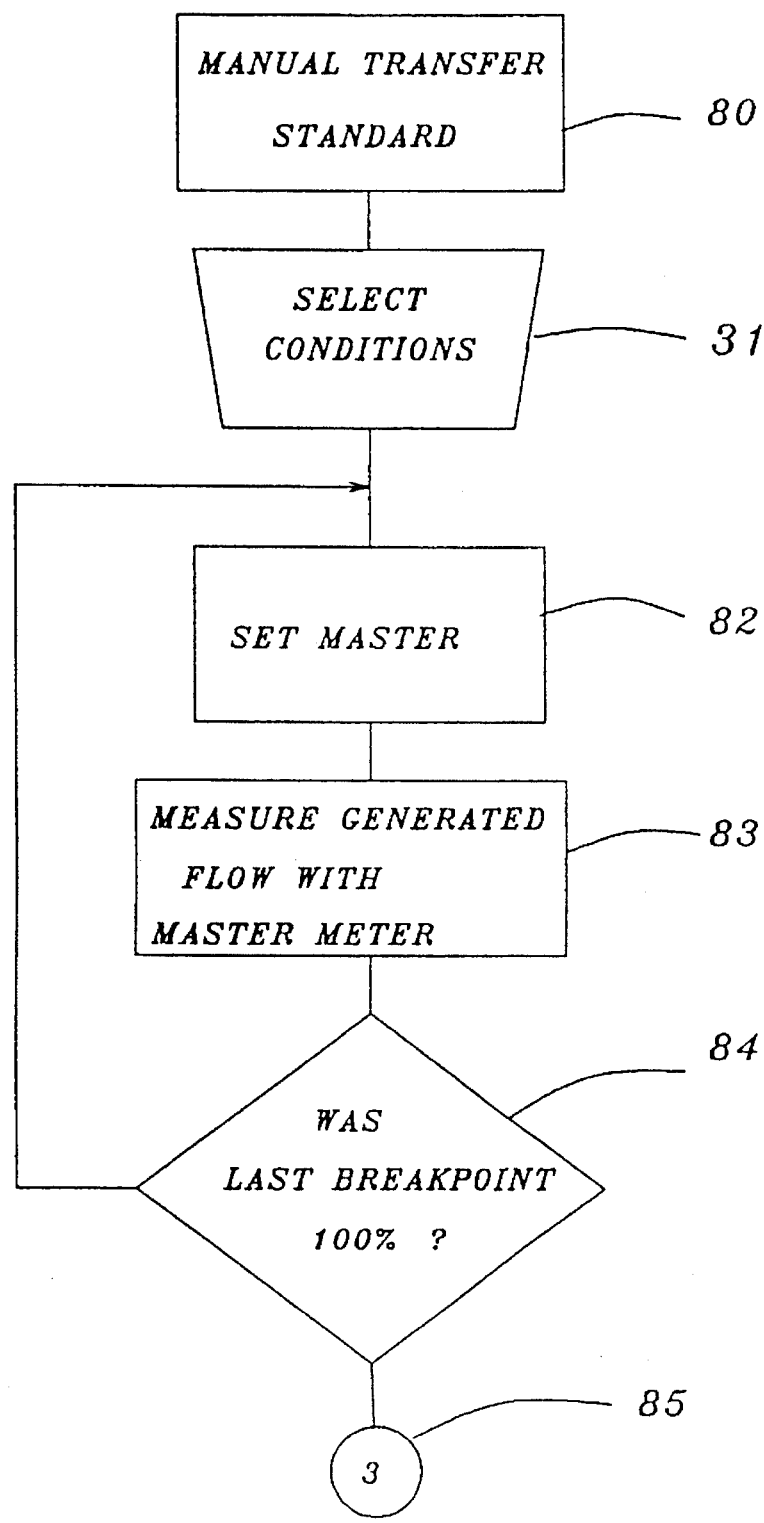
FIG. 7 is a flow chart depicting the method steps, and a computer subroutine to implement those steps, for a method of using a device under test as the standard for establishing flow rate.

Referring now to FIG. 7 there is shown the subroutine which allows the system to function without using its own precision board tubes for flow rate control but using instead a selected flow meter in line with the master flow controller. The use of a master flow controller and an external measuring device is useful sometimes in cases where the functions of the calibration system are needed, but it is impossible or inconvenient to use the decision board tubes for verifying the accuracy of the flow rate. These conditions may exists for example when the gas to be controlled is remote from the calibration system, and cannot be easily connected, the gas is hazardous, the flow rate of the gas is or its temperature is to great for the calibration system to be employed. The subroutine is entered when the MANUAL TRANSFER STANDARD 80 is selected. SELECT CONDITIONS 31 is traversed as has been described above. The master flow controller is then set to the flow rate desired (SET MASTER 82) the flow is thereby generated with the MASTER METER 83. The loop then continues until the LAST BREAKPOINT is 100% 84 as described above with regard to FIG. 5 and if so is exited 85. The MEASURE GENERATED FLOW WITH MASTER METER 83 is equivalent to the conventional operation of the system with the MASTER METER taking the place of the primary standard precision board tubes.

Figure 8:
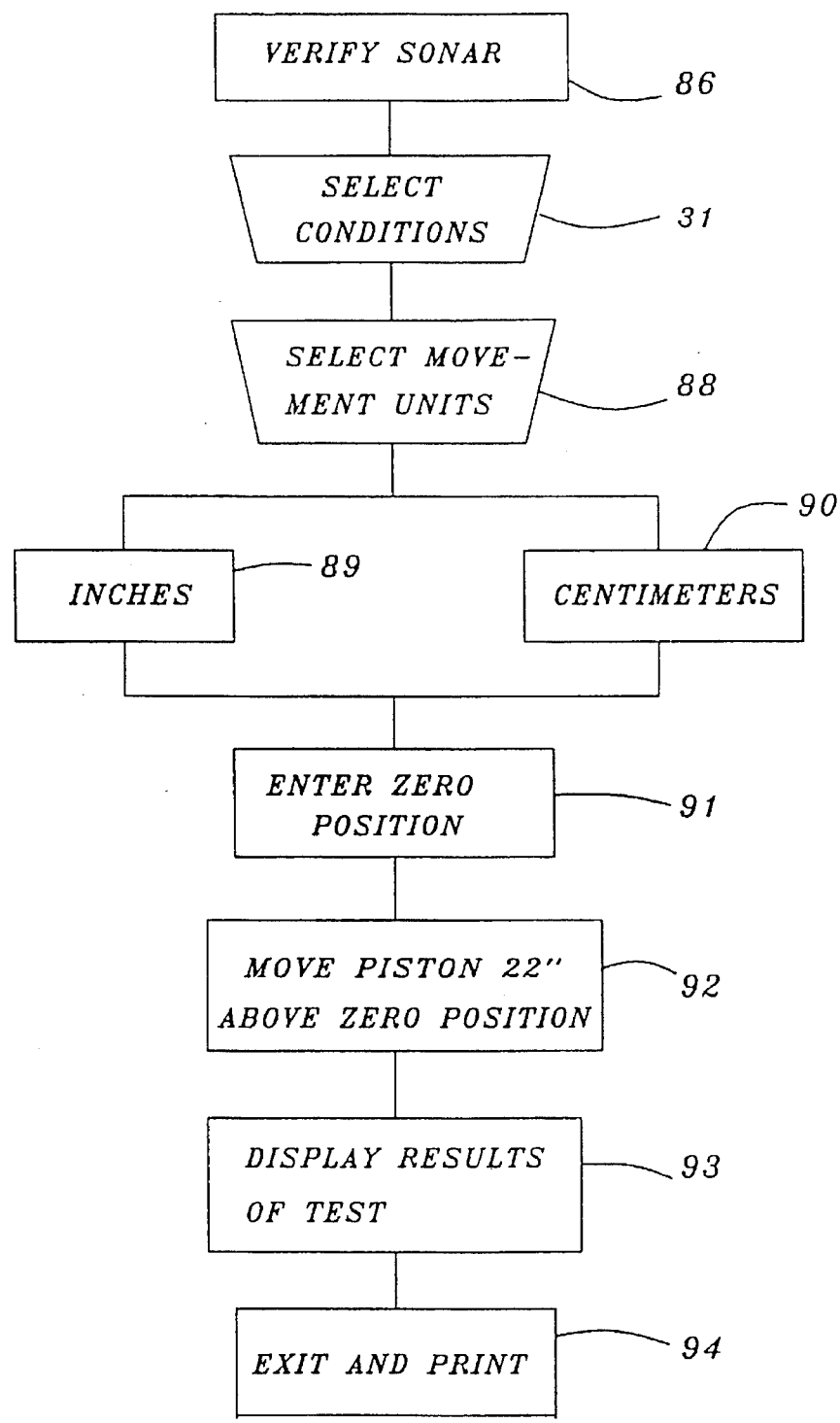
FIG. 8 is'a flow chart depicting the method steps and the computer subroutine to implement those steps, for the method of verifying the operation of the position transducers of the apparatus described in accordance with the present invention.

In FIG. 8 the subroutine needed to determine the correct operation of the position transducers 8, 9, and 10 is shown. Although the sonar principle is extremely accurate and repeatable, it can also be verified by recourse to other very accurate measuring devices such as a cathetometer or a laser interferometer. The VERIFY SONAR 86 subroutine provides an automatic method for incorporating this external verification into the system. Entering the subroutine at 86 and traversing the SELECT CONDITIONS 31 subroutine, the operator is first instructed to select movement units whether inches 89 or centimeters 90. The operator then enters the zero position of the piston, preferably near the bottom of the cylinder, and a measurement of the position of the piston is made. The measurement made by reference to the external standard is then entered into the microcomputer by its keyboard. The program then makes its own reading of that distance and stores the result, the operator is then prompted to manually introduce the test gas and cause the piston to rise until it is approximately 22 inches above the "zero" position at which the operator is prompted to shut off the gas. The operator is then prompted to measure the top of the piston in that position. The program likewise makes its own readings of the distance and the two results are stored by the microcomputer. The result of the process is the display (DISPLAY RESULTS OF TEST 93), which provides both the distance as measured by the system ("system distance") and the distance measured by the operator ("measured distance") as well as the percentage error of the two. The subroutine is then exited at 94.

Figure 9:
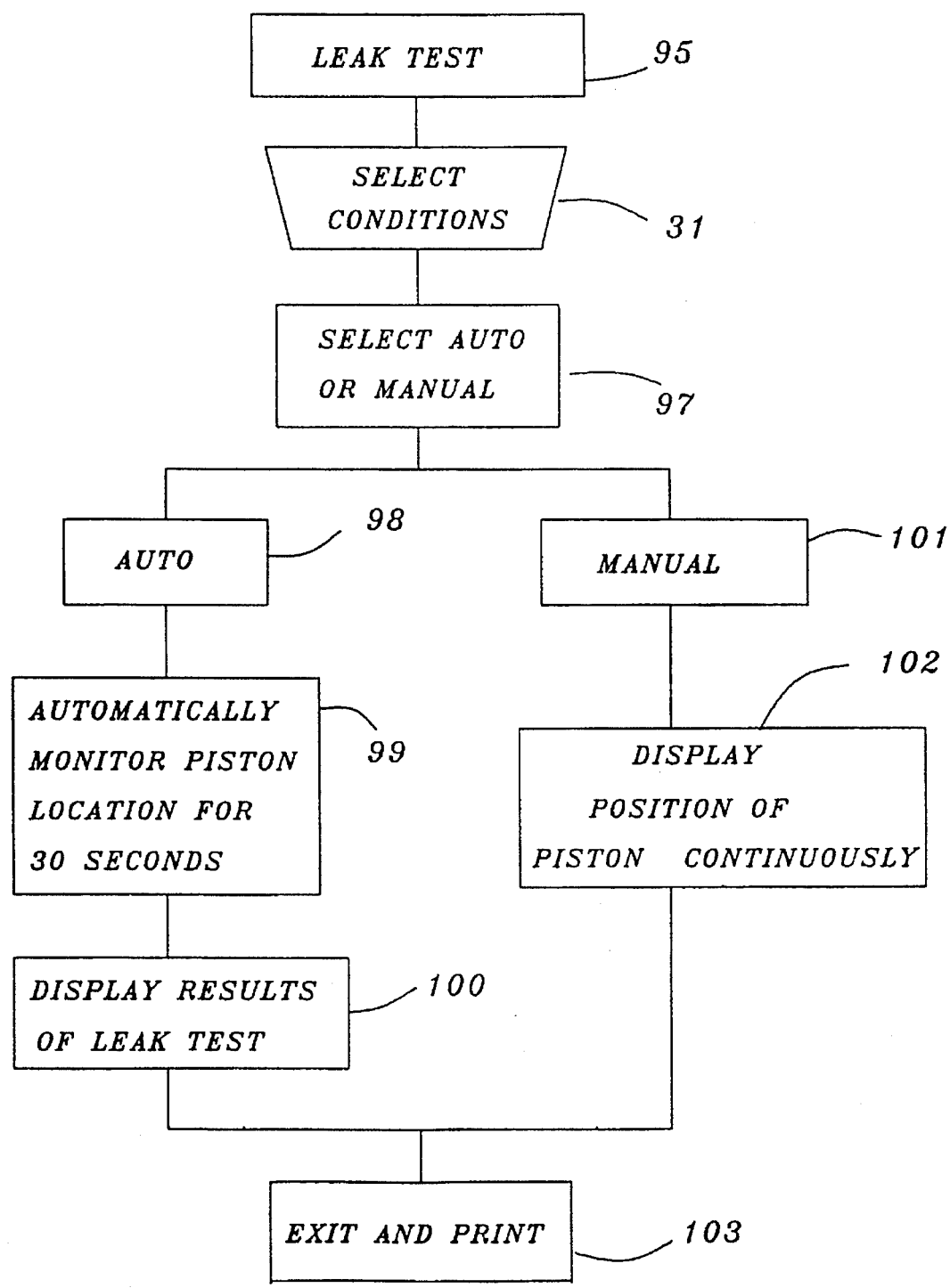
FIG. 9 is a flow chart depicting the method steps and a computer subroutine to implement those steps, for performing a leak test of the apparatus described in the accompanying specification and verifying the integrity of the apparatus before or after performing any of the other subroutines.

In FIG. 9 there is shown the flow chart for the subroutine which verifies the leak integrity of the piston piping system and the seals of the calibration system. Since this process is done automatically, it can be done readily at the start of every day to make sure that the system results for that day are not comprised by undetected flaws.

The subroutine performs the leak test by moving the piston in a cylinder midway up to and then sealing the system. The sonar position transducer systems 8, 9, and 10 make multiple measurements of the position of the piston in each tube. In each measurement, the system performance can be analyzed by the presence of no movement, a downward movement, or an upward movement. If the piston remains in place for thirty seconds within a specified increment of distance the system passes the test. The results of this test are interpreted as follows. If the piston decreases it distance from the transducer, indicating a rising piston, then the system is leaking gas into the system through a valve. If the piston is falling, the gas is leaking out of the system. The system monitors the piston location for thirty seconds and then displays the results (AUTOMATICALLY MONITOR PISTON LOCATION FOR THIRTY SECONDS (99)), display results of leak test (100)). The system may also be operated in a manual mode by choosing the manual subroutine manual 101 in which case the system will display position of piston continuously 102. The display is the actual flight time of the sonar pulse from the transceiver to the top of the piston and the distance moved by the piston can be established by limiting the number of counts which the flight time can change over during the thirty second measurement interval.

While the preferred embodiments of the present invention have been illustrated in detail, it should be apparent that modifications and adaptations of those embodiments will occur to those skilled in the art. In particular it will be understood that the term cylinder above may be used to mean any linearly fixed cross section. Although cylinder normally connotes a circular cross-section, in the context of the patent application it shall be understood to mean any cavity shape which can be slidably sealed with a piston, which piston may have an arbitrary shape. Moreover, the position transducer, though described as a sonar based transducer could be replaced with any of a number of position detecting devices, including optical, electronic, electro-mechanical, and the like. In addition, some of the process steps described can be performed in a different order without affecting the outcome. However, it is to be expressly understood that such modifications and adaptations are within the sphere and scope of the present invention as set forth in the following claims.

What is claimed is:

1. A flow meter calibration system for controlling the flow rate of a gas from a gas supply through a conduit, the system comprising:

a uniform cross-section cylinder communicating with the conduit;

a free-floating piston being slidably sealed to the walls of the cylinder and being moveable over the length of the cylinder under the urging of the gas flowing into the cylinder;

non-contact position transducer means for continuously sensing the position of the piston within the cylinder and for producing an output signal corresponding to that position;

computation means for operating on the output signal received from the position transducer in order to yield a calculated flow rate of gas through the conduit, and further for operating in a closed-loop feedback mode for generating a control signal in response to variations in the calculated flowrate in order to maintain a pre-established flowrate; and a control valve being adjustable to regulate the flow rate of the gas in the conduit in response to the control signal.

\* \* \* \* \*